Feb. 22, 1927.  
R. BEARDSLEY  
1,618,263  
PAPIER MÂCHÉ PRODUCT AND METHOD OF MAKING THE SAME  
Filed Jan. 24, 1923   4 Sheets-Sheet 1
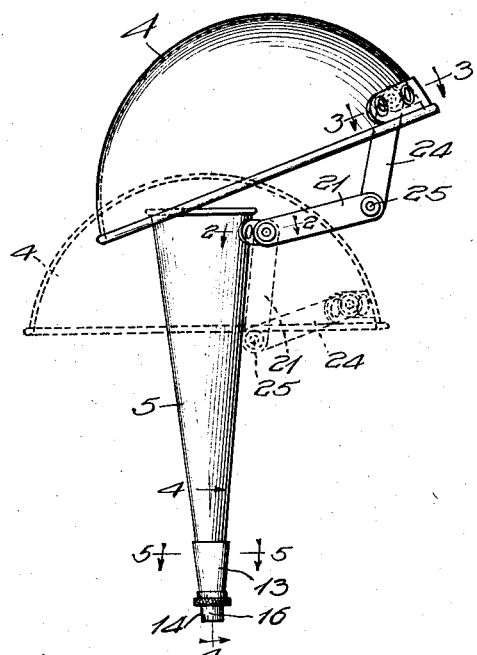
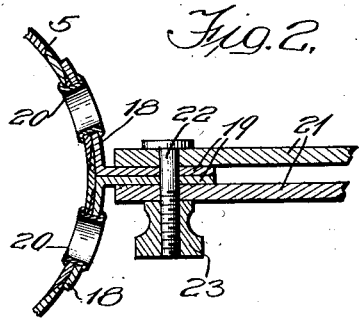
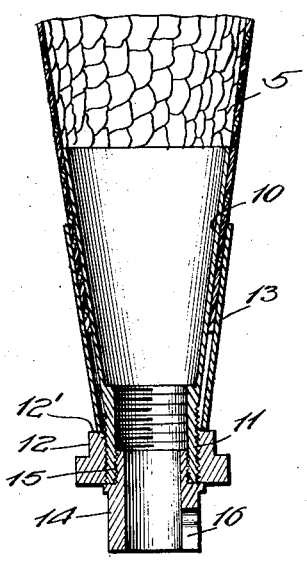
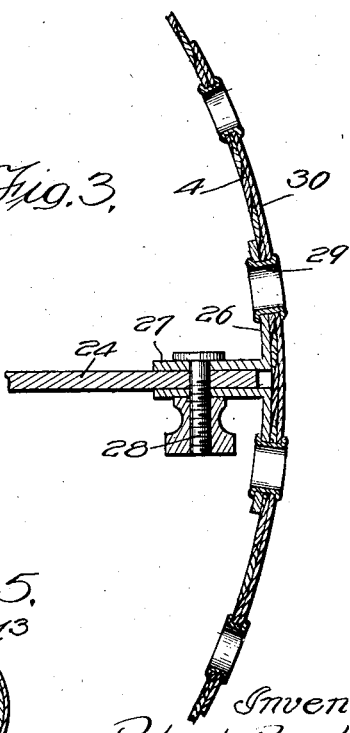
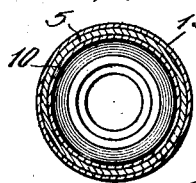
Witnesses:
W. J. Kilroy
Harry R. L. White
Inventor:
Robert Beardsley
By Hill & Hill Attys.

Feb. 22, 1927. 1,618,263
R. BEARDSLEY
PAPIER MÂCHÉ PRODUCT AND METHOD OF MAKING THE SAME
Filed Jan. 24, 1923  4 Sheets-Sheet 2
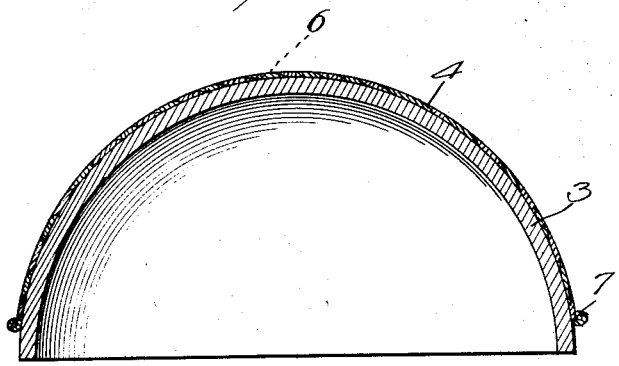
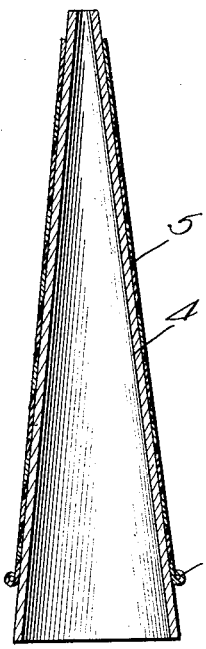
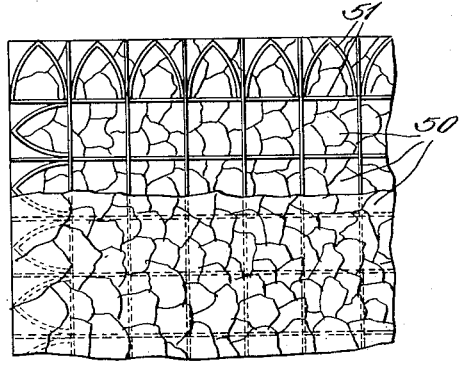
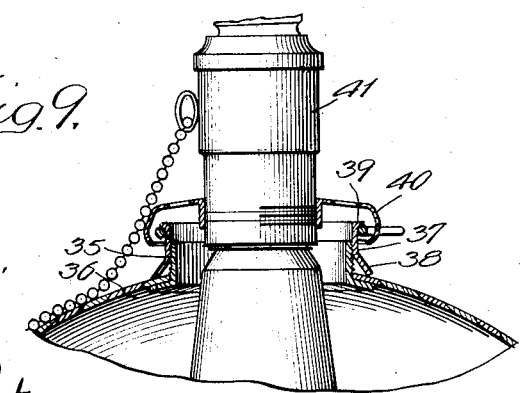

Feb. 22, 1927.
R. BEARDSLEY
1,618,263
PAPIER MÂCHÉ PRODUCT AND METHOD OF MAKING THE SAME
Filed Jan. 24, 1923   4 Sheets-Sheet 3
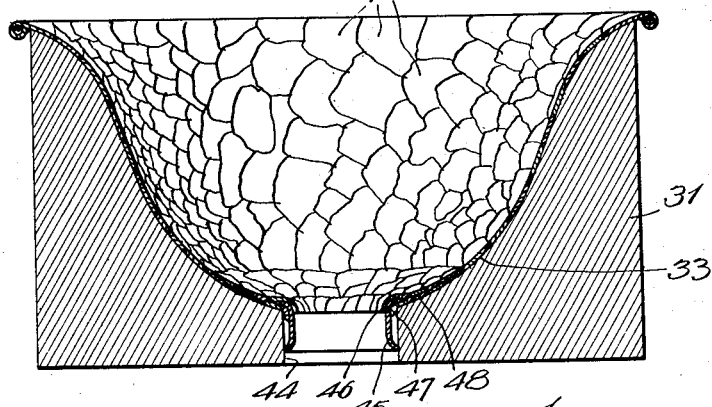
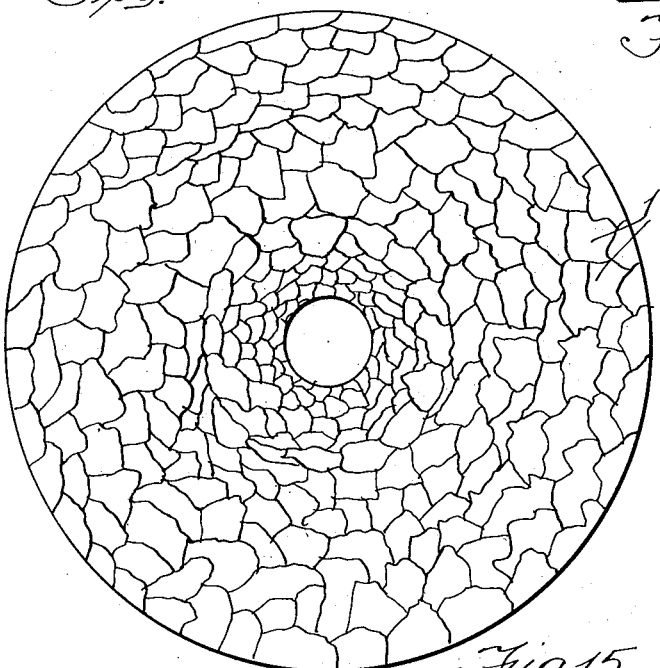
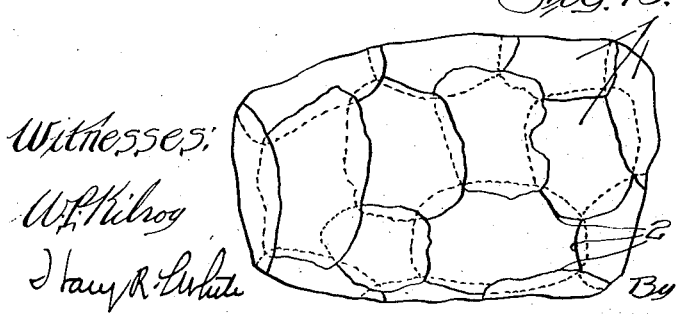
Inventor:
Robert Beardsley

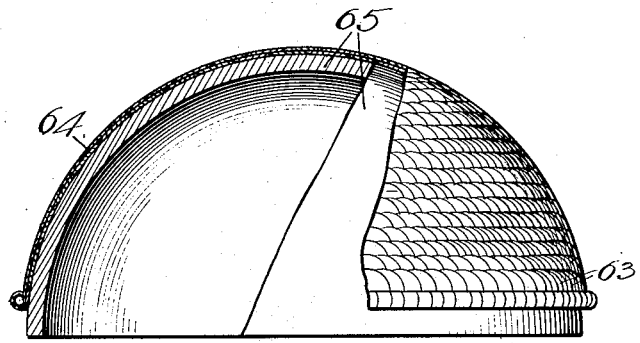
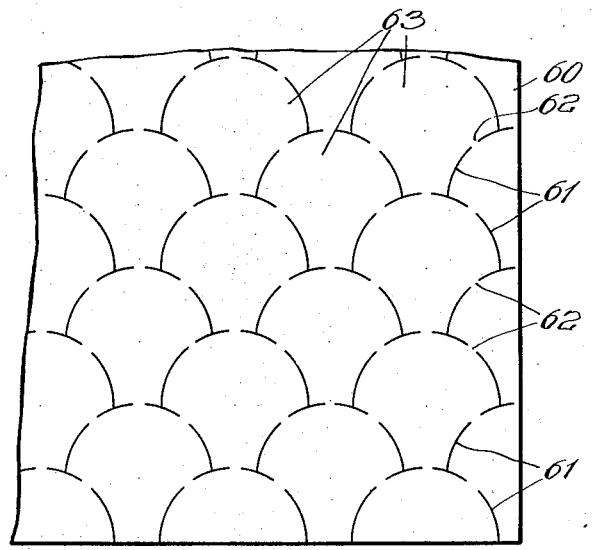
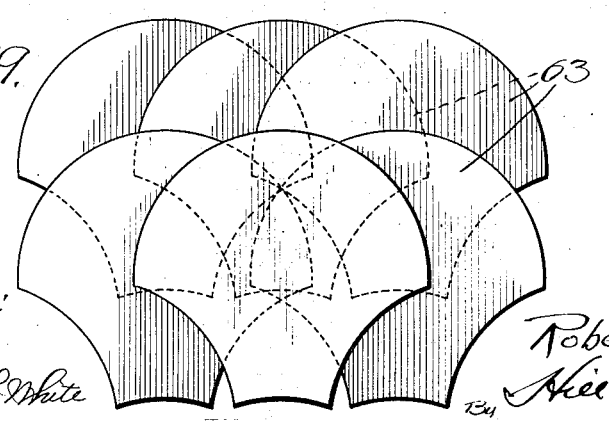

Patented Feb. 22, 1927.

1,618,263

UNITED STATES PATENT OFFICE.

ROBERT BEARDSLEY, OF CHICAGO, ILLINOIS.

PAPIER-MÂCHÉ PRODUCT AND METHOD OF MAKING THE SAME.

Application filed January 24, 1923. Serial No. 614,646.

My invention relates to improvements in what may be termed papier-mâché products and the method or process of making the product. More particularly it relates to an improved method of making a translucent papier-mâché or fibrous article, and the product resulting from the process. The invention has among its objects the production of a product or article of manufacture and the method or process of making the same that is simple, convenient, inexpensive, efficient, durable, attractive and satisfactory. It has among its further objects the production of an attractive, durable, substantially non-breakable article which may be molded or formed in such manner or shape as may be preferred, and decorated or ornamented as found desirable. It has particularly as an object the production of a material which is extremely desirable and satisfactory for use in connection with the manufacture of lamp shades and other articles, and horns and domes or the like, to be used in connection with radio apparatus, phonographs and the like, which will secure a pleasing and non-metallic sound. Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts, Fig. 1 is a view in elevation of an improved horn and dome embodying my improvements;

Fig. 2 is an enlarged sectional view taken substantially on line 2—2 of Fig. 1;

Fig. 3 is an enlarged sectional view taken substantially on line 3—3 of Fig. 1;

Fig. 4 is an enlarged sectional view taken substantially on line 4—4 of Fig. 1;

Fig. 5 is a cross sectional view taken substantially on line 5—5 of Fig. 1;

Fig. 6 is a cross sectional view of a portion of the apparatus, illustrating a step in the manufacture;

Fig. 7 is a similar view, illustrating a similar step in the manufacture of another part;

Fig. 8 is a plan view with a portion broken away, showing the variation in the product;

Fig. 9 is a sectional view illustrating another variation and method of attaching the article to provide a lamp shade;

Fig. 10 is a sectional view illustrating a modified method of manufacture and different type of mold;

Fig. 11 is a plan view illustrating more in detail the appearance of the product during the process;

Figs. 12 and 13 illustrate portions thereof;

Fig. 14 is a sectional view enlarged, taken through one of the portions shown in Figs. 12 or 13, illustrating the preferred feather edge;

Fig. 15 is an enlarged view of a portion of Fig. 11 to more clearly show the construction;

Fig. 16 is an enlarged sectional view illustrating one way of constructing an edge of the product;

Fig. 17 is a sectional view of a portion of a mold illustrating the use of cut pieces of paper;

Fig. 18 is a view of the paper illustrating one manner of cutting; and

Fig. 19 is a view illustrating one manner of using the same in building up an article.

Before describing the process in detail and the various products that can be made therefrom, it may be mentioned that the same consists in taking suitable material, for example, paper or the like, and forming the product to the desired size and shape and treating the same, and working it to produce an article which is hard and holds its shape, and which closely resembles natural parchment, but which while it may resemble parchment, may be so ornamented or decorated, and in fact in the natural product itself, may resemble marble or alabaster. The same is of considerable strength and does not easily fracture or break. I have also found that the same secures wonderful results regarding improved tone when used in connection with radio or phonograph apparatus, and is particularly pleasing when made into shades for lamps, panels or the like. It may be used in place of stained glass, the same being particularly durable when used interiorly for ornamental and decorative purposes. The uses of the product, however, and the variations in the articles manufactured are practically without number, so that I shall herein only attempt to illustrate enough to clearly disclose the method of manufacture and possible products resulting therefrom.

Referring first to Fig. 6 or Fig. 7, 3 and 4 represent forms or molds which are of suitable material, for example, I have found spruce, copper or wood satisfactory for the purpose, although any other material may be used, which is formed to the desired size and shape. The product is made up from a plurality of small pieces of paper 1 or like fibrous material, which may be torn into small pieces in which the tearing, to a large extent, provides a feather edge 2. While these pieces may also be regular in shape, or outline, this is a matter of preference, as they may be cut as shown for example in Figures 18 or 19 hereinafter described. I can make them irregular by merely tearing off pieces from a sheet without any great amount of care as to shape. When cut they are preferably cut so as to conserve material.

I have mentioned paper because I have found this particularly satisfactory, but any equivalent may be employed for the purpose. While various kinds of paper may be used, I might say that I have found a clear, white, pure rag stock paper particularly satisfactory. Also a paper that is more or less porous and that is not sized or glazed is preferred. When torn, I generally use a paper which provides a more or less feather edge. These small pieces of paper whether cut or torn are heavily coated or impregnated with paste, preferably such as will stand heat, the well known library paste having been found satisfactory, and are then arranged over the mold and the product built up to the desired size and shape, this of course depending upon the mold or form. The mold generally should be treated with grease or oil or the like so as to prevent the initial layer or lamination from sticking to the mold or form. The product is built up by arranging pieces overlapping and overlying each other in a more or less regular fashion with the cut pieces, and irregular fashion with the torn as illustrated so that the product is more or less uniform.

In Fig. 7 it is illustrated the mold 4 of a modified type adapted for the forming of the funnel-shaped member 5. In Fig. 6 the product 4 is adapted to be used as a dome or part of a sounding apparatus, as illustrated in Fig. 1, or as a lamp shade or the like as shown in Fig. 9. In this connection it may be mentioned that in some cases an opening may be left in the part, as indicated at 6, in Fig. 6 or the same may be cut out.

I have also shown the outer edge reinforced by a wire 7 or the equivalent, and this is generally folded in and the exterior edge of the body of the product formed over the reinforcement as indicated at 8 in Fig. 16. This not only affords a very efficient and attractive appearance, but also reinforces the product. As a matter of fact, reinforcements may be inserted in the manner described at any point and in any desired way during the making up of the product. In most cases, however, the product is of sufficient strength to serve for the purpose intended without any additional reinforcing means, except possibly for ornamental purposes.

After the product has been formed and hardened, and the paste has set, the article may be removed from the form. I then generally prefer to smooth or finish the article, particularly on the outside; by sand papering by hand, grinding or in an equivalent manner, or, where the shape permits, it may be done very quickly and readily on a sanding or similar machine. While the same may be decorated or ornamented in various ways at a later step, yet if there is to be any ornamentation on the same I generally prefer to do it at this time, and I have found that the same may be ornamented by painting the same with water colors or the equivalent, and it may also be dipped in an alcohol color if desired to afford a pleasing background.

I then subject the product to an oil treatment, substantially as set forth in my application, Serial No. 365,944 consisting in applying oil thereto, preferably dipping the same in a more or less hot oil, linseed or equivalent oil being preferred for the purpose, and at a suitable temperature. In most cases I prefer the oil to be at a temperature of at least 240 degrees and up, and as high as 300 or 400 degrees or more if desired. The time in the bath varies with the materials employed. While the article is still hot I then subject the same to a cold oil treatment, usually plunging the same into a bath of cool or cold linseed or equivalent oil, and it may be mentioned that by "cold," this may be substantially around room temperature. This, however, is a matter of preference, as it may be warmer or colder than the temperature of the room. After the cold oil treatment, the product is permitted to dry. I have found by experiment that the hot treatment immediately followed by the cold treatment is particularly desirable, as it causes a complete and uniform penetration of the oil and secures a very attractive and pleasing, translucent, parchment-like effect. If it appears that the penetration is not complete or uniform it may be returned to the hot bath and thence again given the cold bath. The combined treatments I find also add greatly to the efficiency and effectiveness of the device when employed as a sound horn for radio or phonograph apparatus.

After the oil treatments I usually prefer to treat the product to an application of turpentine or the equivalent, which I have found tends to remove the surplus oil and make the product uniform. The article may be placed in a bath of the turpentine and left the desired time. I may mention that I have also used benzol for the same purpose.

After drying, the product may be treated to a coating of varnish, shellac, lacquer, or the equivalent greatly adding to the appearance, and at the same time providing a protective coating. After this, if desired, the product when dry may be rubbed down with pumice and oil or the equivalent, thereby affording a very smooth and fine, attractive finish. The same may then be equipped with the usual or special fitting, this depending upon the use to which the device or product is to be put.

In Fig. 1, I have illustrated the apparatus for horn or horn and dome, particularly adapted for radio apparatus, phonographs and the like. This particular device I prefer to construct with the part 5 and with a deflector or dome 4, preferably adjustably mounted relative the horn part 5. However, in some places, only one part might be preferred.

Part 5 may be attached to the apparatus in any suitable manner. Referring particularly to Figs. 4 and 5, simple construction which is not only very secure and rigid, but also attractive in appearance, consists in an inner sleeve 10 formed to fit the interior of the part 5, provided with a threaded portion 11 projecting through the small end thereof. A nut 12 is provided and arranged to cooperate with an outer sleeve 13. This forms a very satisfactory construction in a tapered article, as by placing the inner sleeve 10 in the part 5 with the threaded end 11 projecting and arranging the sleeve 13 on the outside and turning the nut 12 down, shoulder 12' will engage with the outer sleeve and the part 5 will be firmly gripped between the two cooperating sleeves. While the part 12 may be constructed directly to engage any suitable part on the apparatus for which it is intended, I prefer to equip the same with a removable attaching member 14, which may be threaded, as indicated at 15, into the part 11. This permits standardization of the parts, as part 14 may be varied to fit any make of apparatus, the other parts being standard. The particular part 14 illustrated is provided with a bayonet-joint slot, so that the part may cooperate with the oppositely formed part in the apparatus. In this particular feature, however, part 14 as mentioned is made to fit the particular apparatus upon which the horn is to be installed.

I have shown the dome or part 4 adjustably carried by part 5, as the same is of light weight and permits this construction without injury to part 5 or part 4. As shown, angle members 18—19 are secured to the part 5 by rivets 20 or their equivalents, and to these members are pivotally secured members 21 or their equivalents. Preferably the members 21 are secured to 19 by an adjusting screw 22 and nut 23, or the equivalent, so that the tension may be varied as desired and the parts adjusted. The members 21, carrying member 24, may be secured thereto at 25, which in turn is pivotally secured to the angle members 26—27 secured to the dome 4 by rivets 29 or the equivalents. I have shown an adjusting screw 28 for securing 24 to the parts 27. If desired, a reinforcing plate 30 may be arranged on the dome. While the connecting means may be modified as desired, that shown is particularly simple and efficient and it may be mentioned that I prefer to make the parts 21 and 24 of fibre or any equivalent non-metallic material. While this is not particularly essential, at the same time it is desirable and therefore preferred. Obviously, the part 4 may be adjusted relative the part 5 in any manner desired, this sometimes depending upon the nature of the sound being transmitted, that is, whether it is vocal or mechanical, or otherwise varied.

As before mentioned, the parts 4 and 5 may be decorated or ornamented as desired. This particular type of apparatus, especially when mounted as shown in Fig. 1, resembles an attractive lamp, and in some instances I have mounted a lamp in the dome so as to have not only the benefit of the light, but also to make the device even more attractive.

Where the part corresponding to 4 is to be used as a lamp shade alone, the part 5 may be of course omitted. I have illustrated in Fig. 9 a part 34 representing a lamp shade, which in this particular instance is provided with an opening at the top. A sleeve 35 is arranged in the opening, the same being flanged as at 36 to engage one face thereof, while the sleeve 37 is arranged to engage the same, and the two parts cooperating securely grip or clamp the shade, similar to the sleeves 10 and 13 previously described. As shown, the part 37 is provided with a flange portion 38 and with a flange at the outer edge, as indicated at 39. In some instances where the shade is supported at the lower edge and the opening is provided in the top of the shade, part 37 is formed with a closed outer end thereby constituting a cap and closing the open end, affording a pleasing appearance. The particular member 37 illustrated, however, affords a convenient method of attaching the same to any of the well known types of shade holders 40, the particular type shown being merely for purposes of illustration adapted to be secured on the socket 41. Of course, member 37 may be modified as desired, depending upon the desired installation of the shade.

Referring to Fig. 10, 31 represents a modified type of mold to which the shade or part 33 is molded from the outside inwardly. Generally I do not prefer this method as well as the other, as it is not as easy to finish the outer face as where the molding is from the inside out and in the other type of mold, the product must dry to the mold and cannot shrink in or warp. In this particular mold 31 illustrated, there is provided an opening 44, and a ring 45 is shown inserted and molded in the shade by bringing the portions 46 and 47 of the shade proper at either side of the flange on the ring 45. This figure, however, illustrates another feature, and that is that wherever desired, the product may be increased in thickness to increase the strength or rigidity by merely making the same thicker at the desired point, as for example, as indicated at 48 in Fig. 10.

In Fig. 8 I have illustrated how a flat panel might be constructed in the same manner previously described, and in this instance, if desired, reinforcing members or strips 51 of wire, cord, or any equivalent may be inserted, which may serve as reinforcements or merely for ornamental purposes, giving the effect of a leaded stained glass panel. This panel is particularly ornamental when employed for interior use, giving the appearance from within of a stained glass window, or when lighted from the interior, giving the same appearance from the exterior. It is particularly adapted for use in halls, dining rooms, bath rooms, churches and other public places where the appearance of a stained glass window is desired at a moderate expense. The same also affords possibilities in ornamentation not always possible in stained glass, except at great expense.

I have previously referred to cutting of the pieces of paper as well as the tearing which is illustrated, and in Figs. 17, 18 and 19, I illustrate cutting of the same, or at least partially cutting, so that it may be conveniently handled and be conveniently used. While the same may be cut in a series of independent pieces, I have found it convenient to cut them from a sheet from which they may be easily detached, and in such form as to not only make them uniform, but also conserve the paper.

Referring particularly to Fig. 18, 60 represents a sheet of paper which may be cut or severed, as indicated at 61, so as to form a series of regularly shaped pieces 63. The same, however, are left with the connecting portions 62 so that the operator can conveniently hold a sheet and pick off the pieces as used. This in reality with this particular type is a combined cutting and tearing, it being understood that they may be entirely torn off, as previously described, or be cut into independent pieces and used as needed.

Fig. 19 illustrates how they may be arranged, this being, however, more or less immaterial and may be varied or modified as desired, as may also the sizes and shapes of the pieces. In Fig. 17 I have shown a portion of a mold 65, and on one side how a shade or the like is built up as indicated at 64 by adding the pieces, as indicated at 63, the same being built up to produce the completed article.

In the preceding I have endeavored to point out a few of the many advantages and possibilities of the product and the variations in the method, and from my own experimenting could give many further examples. However, it is not considered necessary, to go into detail on all of this and many new and novel uses will arise from time to time. It will be obvious from the preceding that a product of any desired size and shape, and ornamented as desired, for any use to which it may be suitable, may be produced.

I am aware that wall board and roofing have been formed from large sheets of paper, such as old newspapers, the sheets of paper being pasted or otherwise secured to each other. Articles embodying my invention are characterized in this; each article is built up from small pieces of paper which do not tend to wrinkle when applied to an arcuate surface ad are readily handled after adhesive has been applied thereto. The largest diameter of each piece of paper is preferably less than 5 inches, as such pieces of paper may be quickly and easily applied to a flat or curved mold with one hand. In the appended claims I have used the term "relatively small" to define such pieces of paper.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. A built-up article made of a plurality of relatively small pieces of paper overlapping at their edges and secured to each other by adhesive.

2. A built-up article made of a plurality of pieces of paper feathered at the edges and overlapped thereat, said pieces of paper being secured to each other by adhesive.

3. A built-up article made of a plurality of irregular pieces of paper having feathered edges overlapping the edges of at least two adjacent pieces, said pieces of paper being secured to each other by adhesive.

4. A built-up article made of a plurality of layers, each layer comprising pieces of paper feathered at their edges and secured to adjacent pieces with an adhesive, so positioned that the feathered edges of adjacent pieces overlap.

5. A built-up article made of a plurality of layers, each layer comprising pieces of paper of irregular outline secured to adjacent pieces with an adhesive, with the edges overlapped and the whole made translucent.

6. A built-up article made of a plurality of relatively small pieces of paper arranged in overlapped relation substantially like scales and secured to each other by adhesive.

7. An article of manufacture comprising a body formed to a predetermined shape, of a plurality of pieces of paper torn from a sheet thereof and secured to each other by adhesive.

8. An article of manufacture, comprising a plurality of pieces of paper pasted together to the thickness desired, and reinforcing means extending across said sheets.

9. An article of the kind described, comprising a plurality of translucent laminated paper pieces and reinforcing members arranged between superimposed laminations.

10. An article of manufacture, comprising a plurality of pieces of paper pasted together to the thickness desired, and reinforcing means extending across said pieces intermediate the laminations thereof.

11. An article of manufacture, comprising a plurality of pieces of paper pasted together to the thickness desired, and rendered translucent, and reinforcing means extending between said pieces in a plurality of intersecting directions.

12. The method of making an article comprising securing relatively small feather-edged pieces of paper together by adhesive with the feathered edges overlapped.

13. The method of making an article comprising the securing of relative small feather-edged pieces of paper together on a mold by adhesive with the feather edges overlapped.

14. The method of making an article comprising pasting relatively small pieces of paper together with an adhesive, the pieces having their edges overlapped and treating the article to make it translucent.

15. The method of making an article comprising securing pieces of paper together about a mold with the edges overlapped, abrading the exterior surface of the article and treating the article to make it translucent.

16. The method of making an article, comprising pasting a plurality of layers of pieces of paper on a mold, the edges of adjacent pieces of each layer overlapping so as to form substantially an article of even thickness, and thence treating to render translucent.

17. The method of making articles of the kind described comprising building up the article of a plurality of pieces of paper secured together, abrading a surface of said built-up article, and treating the abraded article to render it translucent.

In testimony whereof, I have hereunto signed my name.

ROBERT BEARDSLEY.